Sept. 7, 1965  E. MONTUORI  3,204,925
VALVE WITH NONROTATING VALVE STEM
Filed May 15, 1962
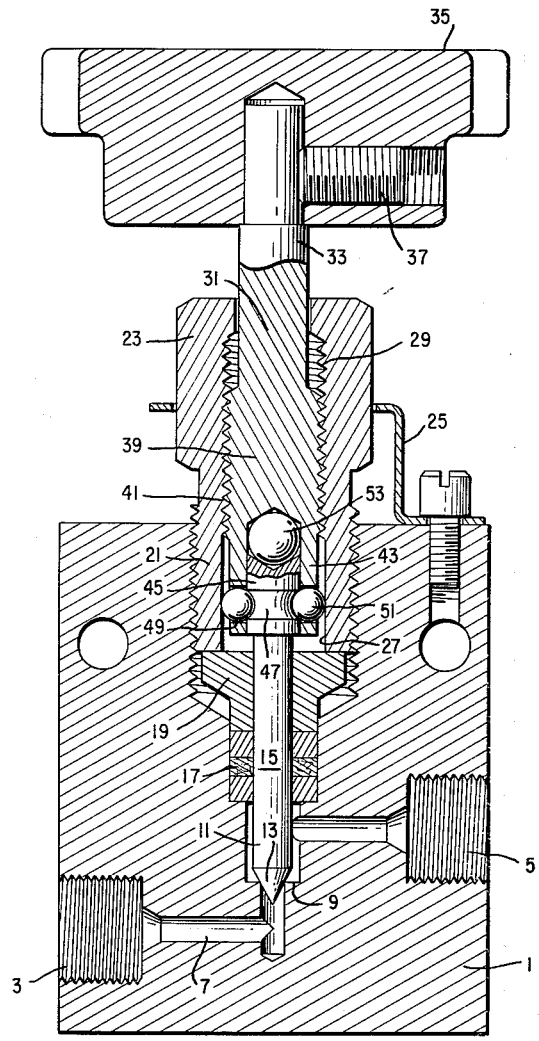
INVENTOR.
ENRICO MONTUORI
BY Shanley & O'Neil
ATTORNEYS

United States Patent Office 3,204,925
Patented Sept. 7, 1965

3,204,925
VALVE WITH NONROTATING VALVE STEM
Enrico Montuori, 3243 P St. NW., Washington, D.C.
Filed May 15, 1962, Ser. No. 194,849
2 Claims. (Cl. 251—274)

The present invention relates to valves, more particularly of the type having a nonrotating valve stem that moves rectilinearly to open and close the fluid passageway of the valve against high pressure fluids.

It is an object of the present invention to provide valves with nonrotating valve stems, which will be relatively simple and inexpensive to manufacture and assemble, easy to operate, maintain and repair, and rugged and durable in use.

Other objects and advantages of the present invention will become apparent from a consideration of the following description, taken in connection with the accompanying drawing, which is a cross-sectional view of a valve according to the present invention.

Referring now to the drawing in greater detail, there is shown a valve having a valve body 1 including a fluid inlet 3 and a fluid outlet 5 interconnected by a fluid passageway 7. Fluid passageway 7 is bordered in part by an annular seat 9 that is a shoulder of demarcation between a relatively small upstream fluid passageway and a relatively large downstream fluid passageway. The relatively large downstream fluid passageway contains the operating end of an elongated valve member 11 which terminates in the upstream direction in a conical face 13 that has a circular line of contact with annular seat 9 in the closed valve position shown in the drawing and which is spaced a substantial distance from annular seat 9 in the open valve position.

Valve member 11 is comprised throughout most of its length by a cylindrical shank 15 that has rectilinear reciprocatory sliding motion within packing 17 that seals against the leakage of fluid from the upstream side of the packing toward the downstream side. Packing 17 is held in place and compressed suitably into fluid sealing relationship against the cylindrical shank 15 of valve member 11 by means of a packing gland 19 against which bears a packing gland nut 21 in the form of a hollow sleeve. Gland nut 21 is externally screw-threaded adjacent its inner end and is in screw-threaded engagement with internal screw threads that are disposed about the cylindrical side wall of the principal cavity of valve body 1. Gland nut 21 has a polygonal and preferably hexagonal head 23 so that a wrench may be fitted over head 23 and turned to impart to gland nut 21 a helical movement axially of valve member 11 so as to increase or decrease the pressure on packing gland 19 and hence the pressure on packing 17. A retainer clip 25 with a hexagonal opening therethrough about the same size and shape as the polygonal cross section of head 23 is detachably retained on valve body 1 over head 23 in the position shown in the drawing, to retain head 23 against undesired adjustive rotation.

As indicated above, gland nut 21 itself is hollow and has a cylindrical bore 27 therein that is internally screw-threaded as at 29 adjacent its upper end as seen in the drawing, which is the outer end of the interior of bore 27 of gland nut 21. The inner end of an upper threaded spindle 31 is disposed in bore 27. Spindle 31 includes a shank 33 that terminates outward in a handle 35 held to shank 33 by a set screw 37. At its end opposite handle 35, spindle 31 has an enlarged end 39 disposed entirely within bore 27, enlarged end 39 being externally screw-threaded as at 41 and being in screw-threaded engagement with the internal screw threads 29 of gland nut 21.

Spindle 31 terminates inward, which is to say downward as viewed in the drawing, in a cylindrical sleeve 43 having cylindrical inner and outer side walls, the inner side wall defining a blind bore in enlarged end 39 of spindle 31. The outer end 45 of valve member 11 is somewhat enlarged as compared to shank 15 thereof; and this enlarged end 45 is disposed within cylindrical sleeve 43 preferably in closely sliding relationship therein with little tolerance or play. An annular groove 47 encompasses end 45 of valve member 11.

A plurality of holes 49 extends through cylindrical sleeve 43 a short distance in from the end of sleeve 43. Holes 49 are closed from each other and are spaced apart equal distances peripherally about sleeve 43 and are disposed with their axes in a common plane perpendicular to the common axis of valve member 11 and spindle 31. Holes 49 extend all the way through sleeve 43 and thus are of a depth equal to the thickness of sleeve 43.

A bearing ball 51 is disposed in each hole 49. Balls 51 are of a diameter greater than the distance between the inner wall of bore 27 and the inner wall of sleeve 43 and hence are still greater in diameter than the thickness of sleeve 43, that is, the depth of the corresponding hole 49. As a result, a portion of each ball 51 is always disposed in groove 47. No ball 51 can leave groove 47 altogether, for the inner wall of bore 27 serves as a keeper that retains all the balls in holes 49 and partly in grooves 47. A relatively large bearing ball 53 disposed in axial alignment with valve member 11 and in a recess in the end of valve member 11 provides an end thrust bearing for valve member 11 relative to spindle 31.

In operation, handle 35 is rotated to open or close the valve. Rotation of handle 35 rotates spindle 31 with it, for spindle 31 is in unitary assembly with handle 35. Rotation of spindle 31 causes the spindle to follow a helical path coaxially of valve member 11, thanks to the interengagement of screw threads 29 and 41. Sleeve 43 thus follows a helical path, and with it holes 49 and balls 51.

Balls 51 cannot leave groove 47, so they revolve in groove 47 and also rotate about their centroids. But as balls 51 follow a helical path, so valve member 11 must also either follow a helical path or move with simple translatory motion. The frictional grip of packing 17 on shank 15 of valve member 11 is made to be firmer than the frictional tendency of balls 51 and 53 to cause valve member 11 to turn with spindle 31. As a result, valve member 11 does not rotate but moves only with translatory motion. Engagement of conical face 13 with annular seat 9 further impedes rotation of valve member 11.

There is thus provided by the present invention an extremely simple and foolproof construction. To assemble the device, it is necessary only to insert the outer end of spindle 31 into the inner end of gland nut 21 until screw threads 29 and 41 are in engagement with each other and until spindle 31 is screwed into gland nut 21 until the holes 49 are just outside the end of sleeve 43. Thereupon the ball 53 may be inserted and with it the enlarged end 45 of valve member 11 until groove 47 and holes 49 are in registry with each other. Then balls 51 are inserted in holes 49 and groove 47 and spindle 31 is screwed further into gland nut 21 so that the balls 51 are held in place by the side wall of bore 27 against dislodgment. The assembly of spindle 31 and gland nut 21 is then screwed into valve body 1 with the packing 17 and packing gland 19 in place, so that conical face 13 pushes through the packing and extends into contiguity with annular seat 9. Gland nut 21 is adjusted in or out by rotation until the proper pressure is imposed on packing 17, whereupon retainer clip 25 is applied and secured to the valve body. Handle 35 is then applied to spindle 31 and set screw 37 is tightened to complete the valve assembly. The valve can then be incorporated as a unit in any high pressure fluid circuit in which the fluid may be either a gas or a liquid.

From a consideration of the foregoing disclosure, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A valve having a housing having an inlet and an outlet and a fluid passageway interconnecting the inlet and the outlet in said housing, an elongated valve member reciprocable axially of itself to open and close the passageway, a valve actuator screw-threadedly mounted on the valve for helical movement coaxially of the valve member and having a cylindrical sleeve within which one end of the valve member is disposed, said sleeve being disposed in and helically movable relative to a cylindrical bore in the valve fixed relative to said housing, the sleeve having a plurality of peripherally spaced holes therethrough in registry with an annular groove about said end of the valve member, and a ball in each said hole, each ball being of a diameter greater than the distance from the inner wall of the valve bore to the inner wall of the sleeve thereby to assure that the inner wall of the bore serves as a keeper to maintain the ball in the holes and in the groove so that helical movement of the valve actuator can move the valve member axially without necessarily turning the valve member, said cylindrical bore having a cylindrical surface extending a substantial distance in both directions from said balls.

2. A valve as claimed in claim 1, said cylindrical surface being spaced a substantial distance radially outwardly from the outer surface of said sleeve.

References Cited by the Examiner

UNITED STATES PATENTS

| | | | |
|---|---|---|---|
| 1,031,637 | 7/12 | Fischer. | |
| 1,551,436 | 8/25 | Stacy | 251—88 |
| 3,049,332 | 8/62 | Webster | 251—27 X |

FOREIGN PATENTS

| | | |
|---|---|---|
| 1,203,049 | 7/59 | France. |
| 437,288 | 6/48 | Italy. |

ISADOR WEIL, *Primary Examiner.*

WILLIAM F. O'DEA, *Examiner.*